Dec. 7, 1926.
G. W. MICHAEL
1,610,141
MAGNETIC CLUTCH FOR AUTOMOBILE SIGNALS
Filed May 2, 1925
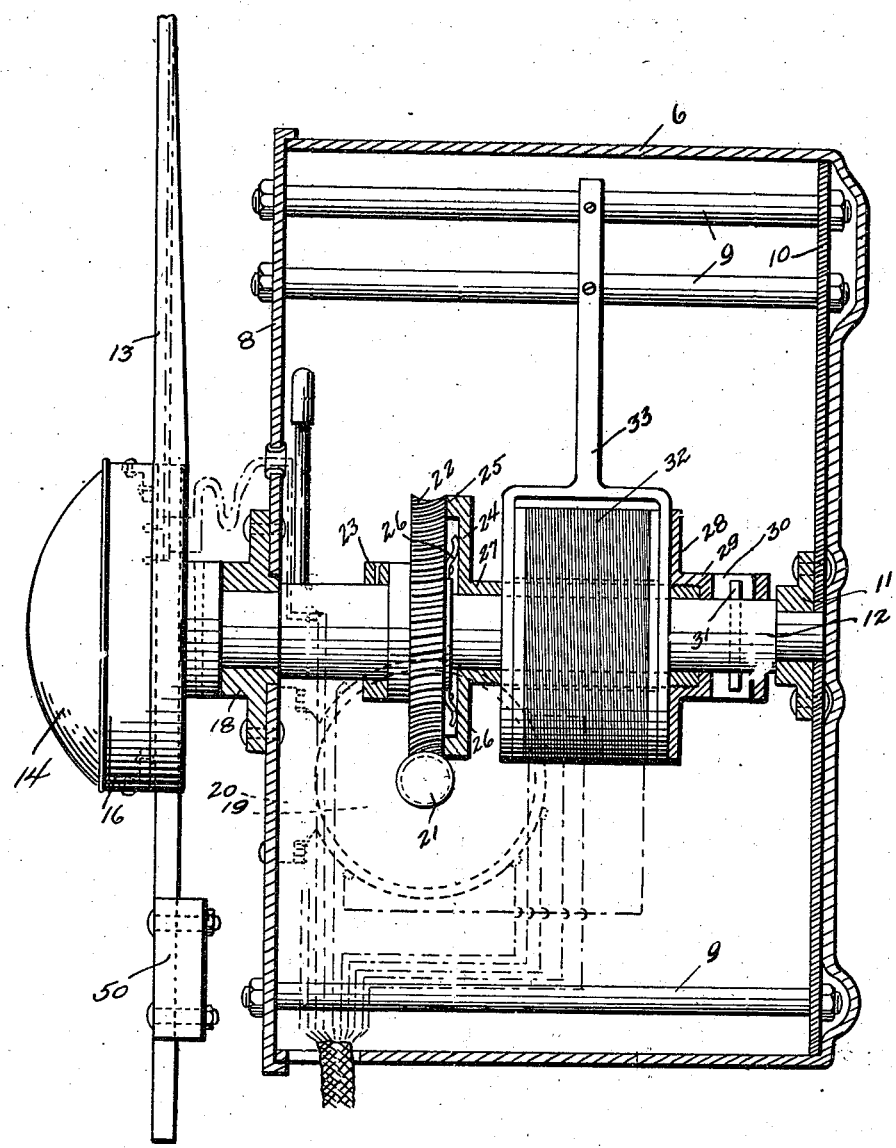
Inventor
George W. Michael
By Edgar T. Gaddis
Attorney Patented Dec. 7, 1926.

1,610,141

UNITED STATES PATENT OFFICE.

GEORGE W. MICHAEL, OF WILKES-BARRE, PENNSYLVANIA.

MAGNETIC CLUTCH FOR AUTOMOBILE SIGNALS.

Application filed May 2, 1925. Serial No. 27,507.

This invention relates to magnetic clutches adapted for use with automobile signals to indicate intended movements of the vehicle. In some respects it is an improvement on the signal shown and described in my pending application filed May 22, 1923, Serial No. 640,677.

The object of the present invention is to improve and simplify the construction of such signals, the structure as compared to the apparatus shown in said application embracing fewer parts, and capable of much cheaper construction, and involving a simple clutch arrangement operated by an electromagnet when the signal is actuated. The operating mechanism for the signal includes a reversible motor, so controlled that when a turn in one direction is intended the indicating arm or semaphore will point in that direction; and similarly when turned in the other direction. The apparatus includes electric lamps and colored lenses for night indication. A suitable switch is employed to control the operation of the motor and magnet.

The accompanying drawing is a side elevation of the apparatus, partly in section.

In the embodiment shown, the construction includes a cup-shaped casing 6 which may be mounted on the rear of the vehicle or elsewhere in any convenient manner. The rear wall of the casing consists of a plate 8 which is bolted as indicated at 9 to a plate 10 which has a bearing 11 for one end of a shaft 12 which extends across the casing, preferably at the center thereof, and at its other end has mounted thereon a semaphore arm 13. The rear bearing for the shaft 12 is indicated at 18, fastened to the back plate 8.

An electric motor 19 is supported by a bracket 20 on the back plate 8, and the shaft of this motor has a worm 21 which meshes with a worm gear 22 which is loose on the shaft 12, being confined by a collar 23. This worm gear forms one member of a friction clutch the other member of which consists of a disc 24 with a friction ring 25 which closes against the side of the gear 22 to be driven by the latter. Springs 26, fixed to the side of the rear wall of the worm gear, tend to open the clutch. The disc 24 forms the end wall of a sleeve or spool 27 which is slidable on the shaft 12. The other end of the spool consists of a member 28 screwed on the sleeve, and this member 28 has a hub 29 with slots 30 into which project the ends of a pin 31 extending thru the shaft 12 and forming the driving connection between the sleeve and the shaft.

Surrounding the sleeve 27 is a magnet coil 32, supported by a hanger 33 which is fixed to the bolts 9 as shown in the drawing. The member 28 of the spool or sleeve constitutes in effect the armature of the magnet and is actuated by the latter to throw the clutch in when the magnet is energized. At other times the springs 26 open the clutch.

The magnet and motor circuits are all controlled by a suitable switch known in the art which may be actuated to drive the motor in either direction and at the same time to close the magnet circuit and the lamp circuit. This switch may be of the automatic type, operated by movement of the steering wheel, or it may be a hand-operated switch, both of which are known in the art and require no illustration or description since the invention is not directed thereto.

The semaphore arm 13 has an adjustable counterweight 50 which tends to swing the arm to vertical position, as when the vehicle is proceeding without turning.

In operation, when a turn is to be made, the switch is closed, either automatically or otherwise to close the motor circuit according to the direction of turn. This starts the motor which thru the worm gearing drives the clutch gear wheel 22. At the same time, the circuit of the magnet is closed. This shifts the sleeve 27 until the friction rim 25 closes against the side of the wheel 22 thereby forming a friction clutch which causes the sleeve 27 to rotate with the gear 22, and the driving pin 31 causes the shaft 12 to turn and swing the semaphore arm 13 in the desired direction. Since the motor continues to run while the main switch is closed the gear 22 will continue to turn, but the friction clutch permits this without wrecking the apparatus, the necessary slip taking place between the gear 22 and the friction rim 25. When the main switch is opened, as when the vehicle is turned to straight direction, the springs 26 open the clutch, and the weight 50 restores the semaphore arm to upright position. When a turn is made in the other direction, the motor is actuated in the reverse direction and the arm is swung the other way, the other operations being similar. The slot 30 permits the necessary axial movement of the sleeve to open or close the clutch.

The invention is not limited to the particular form of appartus shown, but various modifications are possible within the scope of the following claim. Thus the particular mechanism described is capable of use in connection with a railway signal or the like. It may also be mentioned that when the present aparatus is used on an automobile a stop indication may be given by so manipulating the switch that the motor will be reversed repeatedly, thereby causing a repeated swing of the semaphore, first in one direction and then in the other, the oscillation of the semaphore indicating an intent to stop.

I claim:—

The combination with a shaft, of an electric motor, a gear loose on the shaft and driven by the motor, a magnet coil mounted in fixed position around the shaft, a sleeve slidable lengthwise on the shaft within said coil, a friction disc carried at one end of the sleeve and adapted to be moved outwardly from the coil into contact with the gear when the magnet is energized, an armature disc carried by the other end of the sleeve and adapted to be moved toward the coil when the latter is energized, and a spring between the gear and the friction disc adapted to move the latter out of contact with the former when the magnet is deenergized.

In testimony whereof, I affix my signature.

GEORGE W. MICHAEL.